United States Patent
Mikawa

(10) Patent No.: US 11,729,924 B2
(45) Date of Patent: Aug. 15, 2023

(54) DISPLAY APPARATUS

(71) Applicant: Akihisa Mikawa, Kanagawa (JP)

(72) Inventor: Akihisa Mikawa, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 17 days.

(21) Appl. No.: 17/505,692

(22) Filed: Oct. 20, 2021

(65) Prior Publication Data

US 2022/0159851 A1    May 19, 2022

(30) Foreign Application Priority Data

Nov. 13, 2020  (JP) ................................ 2020-189784

(51) Int. Cl.
| | |
|---|---|
| H05K 5/02 | (2006.01) |
| C09J 7/38 | (2018.01) |
| C09J 183/04 | (2006.01) |
| H05K 5/00 | (2006.01) |

(52) U.S. Cl.
CPC .................. *H05K 5/02* (2013.01); *C09J 7/38* (2018.01); *C09J 183/04* (2013.01); *H05K 5/0017* (2013.01); *C09J 2203/326* (2013.01); *C09J 2301/124* (2020.08); *C09J 2483/00* (2013.01)

(58) Field of Classification Search
USPC ................................. 361/807, 809, 810, 728
See application file for complete search history.

(56) References Cited

U.S. PATENT DOCUMENTS

| | | | |
|---|---|---|---|
| 2008/0210843 A1* | 9/2008 | Han | H05K 5/0213 361/679.01 |
| 2010/0149452 A1* | 6/2010 | Harada | G02F 1/1333 445/24 |
| 2015/0185537 A1 | 7/2015 | Yamashita et al. | |
| 2015/0185538 A1 | 7/2015 | Yamamichi et al. | |
| 2015/0311632 A1 | 10/2015 | Ishikawa et al. | |
| 2016/0198134 A1 | 7/2016 | Mikawa et al. | |
| 2016/0277716 A1 | 9/2016 | Mikawa et al. | |
| 2017/0017092 A1 | 1/2017 | Mikawa | |

(Continued)

FOREIGN PATENT DOCUMENTS

| | | |
|---|---|---|
| CN | 105786103 A | 7/2016 |
| JP | 2013-258653 | 12/2013 |

(Continued)

OTHER PUBLICATIONS

Extended European Search Report dated Mar. 25, 2022, in corresponding European Patent Application 21207240.9.

*Primary Examiner* — Hung S. Bui
(74) *Attorney, Agent, or Firm* — Xsensus LLP

(57) ABSTRACT

A display apparatus includes a display, a housing including a peripheral portion having a first side to which the display is attached, a back plate attached to s second side of the peripheral portion of the housing, and a plurality of double-sided adhesive tapes attached to the peripheral portion. Each of the plurality of double-sided adhesive tapes includes an end portion having an opening. The peripheral portion includes an adhesive-applied region applied with adhesive and a region not applied with the adhesive, and the adhesive-applied region extends from the opening in one of the plurality of double-sided adhesive tapes to the opening in the adjacent one of the plurality of double-sided adhesive tapes.

16 Claims, 12 Drawing Sheets

(56) References Cited

U.S. PATENT DOCUMENTS

| | | |
|---|---|---|
| 2017/0026623 A1 | 1/2017 | Nishi et al. |
| 2017/0187996 A1 | 6/2017 | Yokoyama et al. |
| 2017/0244940 A1 | 8/2017 | Mikawa et al. |
| 2019/0129236 A1* | 5/2019 | Kim ................... H04M 1/0249 |
| 2019/0154906 A1* | 5/2019 | Lee ..................... G02B 6/0031 |

FOREIGN PATENT DOCUMENTS

| | | |
|---|---|---|
| JP | 2015-144410 | 8/2015 |
| JP | 2020-118885 A | 8/2020 |
| WO | 2019/021796 A1 | 1/2019 |

* cited by examiner

DISPLAY APPARATUS

CROSS-REFERENCE TO RELATED APPLICATION

This patent application is based on and claims priority pursuant to 35 U.S.C. § 119(a) to Japanese Patent Application No. 2020-189784, filed on Nov. 13, 2020, in the Japan Patent Office, the entire disclosure of which is incorporated by reference herein.

BACKGROUND

Technical Field

Embodiments of the present disclosure relate to a display apparatus.

Related Art

There is known a related-art mobile terminal in which a transparent cover that covers a rectangular plate-shaped screen is attached to a housing including a screen mount that accommodates the screen. The cover is attached to the housing with a frame-shaped double-sided adhesive tape attached to the peripheral portion of the screen mount to provide waterproofness.

SUMMARY

An embodiment provides a display apparatus that includes a display, a housing including a peripheral portion having a first side to which the display is attached, a back plate attached to s second side of the peripheral portion of the housing, and a plurality of double-sided adhesive tapes attached to the peripheral portion. Each of the plurality of double-sided adhesive tapes includes an end portion having an opening. The peripheral portion includes an adhesive-applied region applied with adhesive and a region not applied with the adhesive. The adhesive-applied region extends from the opening in one of the plurality of double-sided adhesive tapes to the opening in the adjacent one of the plurality of double-sided adhesive tapes.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
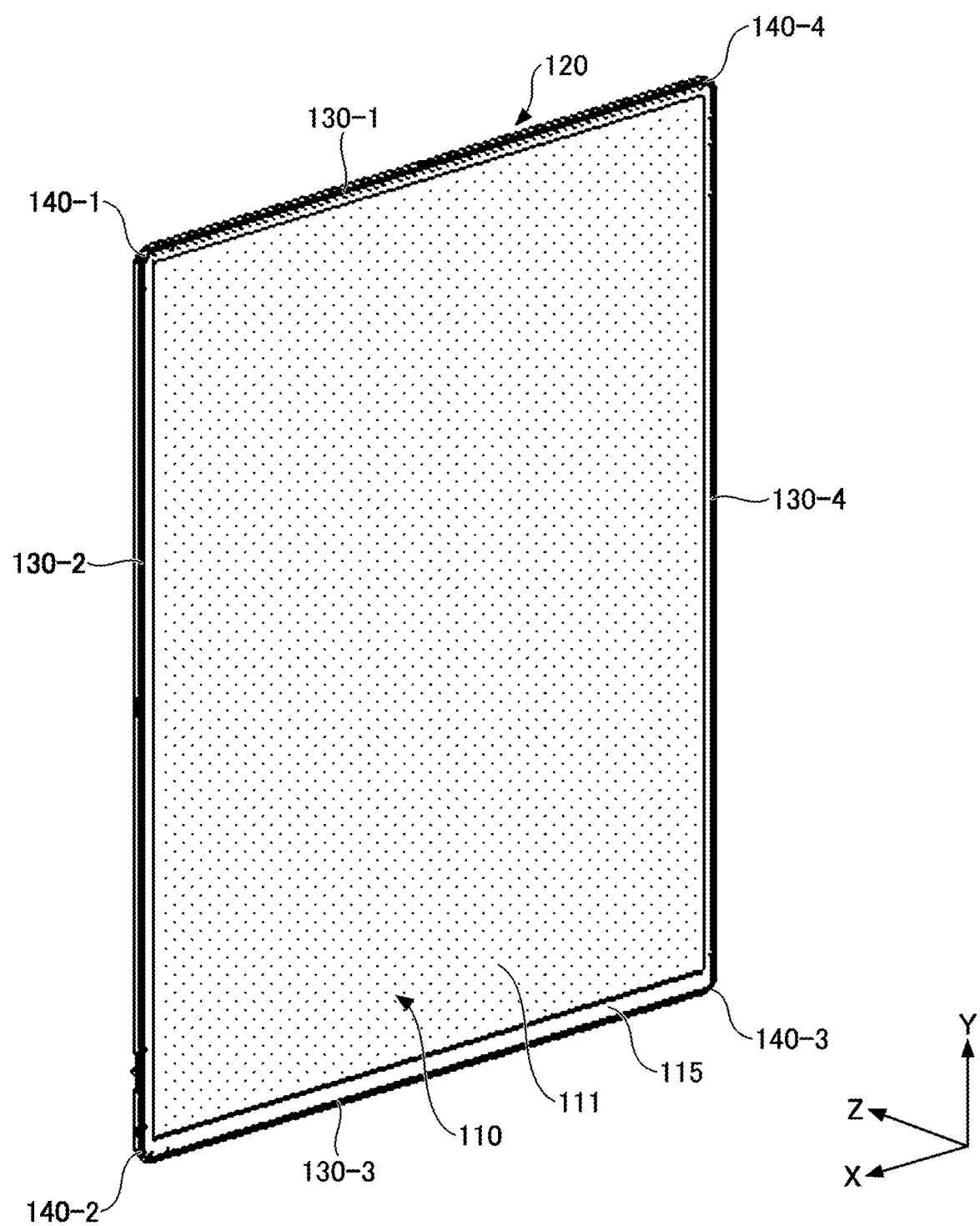
FIG. 1 is a perspective view of an information display apparatus according to one embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below with reference to the drawings. As used herein, the singular forms "a," "an," and "the" are intended to include the plural forms as well, unless the context clearly indicates otherwise.

In the drawings, like reference numerals designate identical or corresponding parts throughout the several views thereof, and redundant description are avoided. Further, in order to facilitate understanding, the scale of each part in the drawing may differ from the actual scale. In the directions such as parallel, right angle, orthogonal, horizontal, vertical, up and down, and lateral directions, a deviation is allowed to the extent that does not impair the effect of embodiments of the present disclosure. The shape of a corner is not limited to a rectangular shape, and may be rounded into an arcuate shape. The terms parallel, right-angled, orthogonal, horizontal, and vertical may include substantially parallel, substantially right-angled, substantially orthogonal, substantially horizontal, and substantially vertical, respectively.

FIG. 1 is a perspective view of an information display apparatus according to the present embodiment. In the following description, for convenience, an X-axis direction in the drawings is defined as a lateral direction, a Y-axis direction in the drawings is defined as a vertical direction, and a Z-axis direction in the drawings is defined as a front-rear direction. The X-axis direction (lateral direction) is parallel to a screen of the information display apparatus and the short-side direction of the screen. The Y-axis direction (vertical direction) is parallel to the screen of the information display apparatus and the longitudinal direction of the screen. The Z-axis direction is perpendicular to the X-axis direction and the Y-axis direction.

An information display apparatus 100 illustrated in FIG. 1 includes an information display 110 (an example of a display) and a housing 120.

The information display apparatus 100 displays, on the information display 110, information transmitted from a personal computer (PC) or the like. Further, the information display apparatus 100 accepts input of characters and illustrations to the information display 110 by handwriting using a dedicated pen-shaped input device (also called an input pen or a touch pen).

Further, for example, the information display apparatus 100 of the present embodiment may be portable, and the shape of the back face described later is flat. Therefore, the information display apparatus 100 of the present embodiment is usable, for example, in a state being placed flat on a desk. A plurality of viewers can have a discussion around the information display apparatus 100.

The information display 110 of the present embodiment includes a screen 111 that displays an image or information, and a bezel 115 that supports the screen 111.

The housing 120 of the present embodiment holds the information display 110. The housing 120 accommodates a circuit or the like therein, to drive the information display 110.

The housing 120 of the present embodiment includes frames 130-1, 130-2, 130-3, and 130-4 to which respective sides of the rectangular information display 110 are secured. The frame 130-1 and the frame 130-3 secure the short sides of the information display 110. The frame 130-2 and the frame 130-4 secure the long sides of the information display 110. In the following description, the frames 130-1, 130-2, 130-3, and 130-4 may be collectively referred to as the frames 130 when not distinguished from each other.

The housing 120 includes corner members 140-1, 140-2, 140-3, and 140-4 to couple the frames 130 to each other. The corner member 140-1 couples the frame 130-1 with the frame 130-2. The corner member 140-2 couples the frame 130-2 with the frame 130-3. The corner member 140-3 couples the frame 130-3 with the frame 130-4. The corner member 140-4 couples the frame 130-4 with the frame 130-1. In the following description, the corner members 140-1, 140-2, 140-3, and 140-4 may be referred to as the corner members 140 when not distinguished from each other.

The housing 120 further includes pen storages 170-1 (illustrated in FIG. 2) and 170-2 (illustrated in FIG. 7) to accommodate pen-shaped input devices described later, and a battery storage 180 to accommodate a battery for supplying electric power to the information display apparatus 100 (illustrated in FIG. 7).

Figure 2:
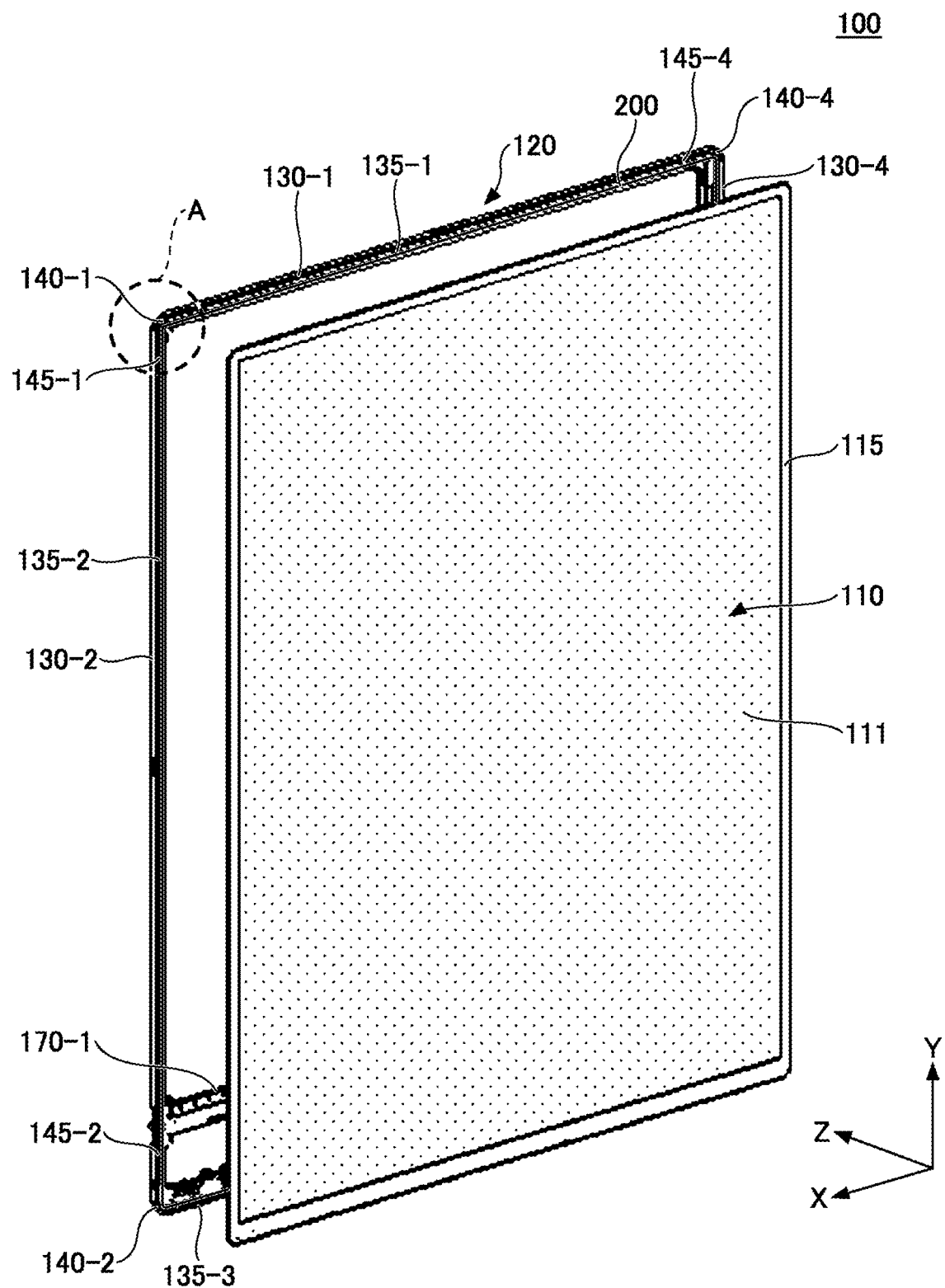
FIG. 2 is a first exploded perspective view of the information display apparatus illustrated in FIG. 1.

FIG. 2 is a first exploded perspective view of the information display apparatus 100. Specifically, FIG. 2 is a view separately illustrating the information display 110 and the housing 120.

In the information display apparatus 100 of the present embodiment, the frame 130 has a peripheral portion 135, and the corner member 140 has a peripheral portion 145. The front side of the peripheral portion 135 and the front side of the peripheral portion 145 include a frame-shaped adhesive region 200 formed by a plurality of double-sided adhesive tapes divided (cut) into rectangular shapes. The back side of the peripheral portion 135 and the back side of the peripheral portion 145 include a frame-shaped adhesive region 300 formed by a plurality of double-sided adhesive tapes divided (cut) into rectangular shapes (see FIG. 8).

If the frame-shaped adhesive region 200 or 300 is formed with a single frame-shaped double-sided adhesive tape die-cut from a double-sided adhesive tape sheet, a central portion of the double-sided adhesive tape sheet is discarded. Discarding the central portion is waste of the cost, in particular, when the frame-shaped double-sided adhesive tape is used in a large display such as an electronic whiteboard. Alternatively, for example, an adhesive may be used instead of the double-sided adhesive tape. However, an adhesive coating equipment is expensive when the display is large.

By contrast, in the present embodiment, the frame-shaped adhesive regions 200 and 300 are formed by a plurality of double-sided adhesive tapes.

In the following description, in each of the peripheral portion 135 and the peripheral portion 145, the face bonded to the information display 110 is referred to as the front side, and the face bonded to a back plate 190 (see FIG. 8) described later is referred to as the back side.

According to the present embodiment, in the adhesive region 200 and the adhesive region 300, each of the rectangular double-sided adhesive tapes includes a slit (an example of an opening in the double-sided adhesive tape) at an end facing another double-sided adhesive tape, and an adhesive is applied to a continuous area including the slits in the plurality of double-sided adhesive tapes.

That is, the continuous adhesive regions 200 and 300 are formed by the plurality of double-sided adhesive tapes and the adhesive applied to a region extending from the slit at the end of one of the plurality of double-sided adhesive tapes to the slit at the end of another double-sided adhesive tape.

In other words, the housing 120 surrounding the information display 110 includes a peripheral portion having the front side bonded to the information display 110 and the back side bonded to the back plate 190. Further, a plurality of double-sided adhesive tapes is attached to the peripheral portion, each of the double-sided adhesive tapes has the slit at the end, and the adhesive is applied to the region extending from the slit in one double-sided adhesive tape to the slit in another double-sided adhesive tape.

In other words, in present embodiment, the double-sided adhesive tapes having ends in which the slits are formed are attached to the peripheral portion of the housing 120, and the adhesive is applied to the region extending from the slit at the end of one double-sided adhesive tape to the slit at the end of another double-sided adhesive tape. That is, the region to which the adhesive is applied starts from the slit at the end of one of the double-sided adhesive tapes and ends at the slit at the end of the adjacent double-sided adhesive tape.

In the present embodiment, the "peripheral portion" is along the inner circumference (closer to the center of the screen 111) of the housing 120 surrounding the information display 110, and has a certain width. The width of the "peripheral portion" is equal to or larger than the length of the short side of the double-sided adhesive tape.

In the present embodiment, the peripheral portion 135 includes a peripheral portion 135-1 in the frame 130-1, a peripheral portion 135-2 in the frame 130-2, and a peripheral portion 135-3 in the frame 130-3. The peripheral portion 145 includes a peripheral portion 145-1 in the corner member 140-1, a peripheral portion 145-2 in the corner member 140-2, and a peripheral portion 145-4 in the corner member 140-4.

The peripheral portions 135-1, 135-2, and 135-3 may be collectively referred to as the peripheral portions 135 when not distinguished from each other. Note that the frame 130-4 also includes a peripheral portions 135 to which double-sided adhesive tapes are attached. The peripheral portions 145-1, 145-2, and 145-4 may be collectively referred to as the peripheral portions 145 when not distinguished from each other.

Figure 3:
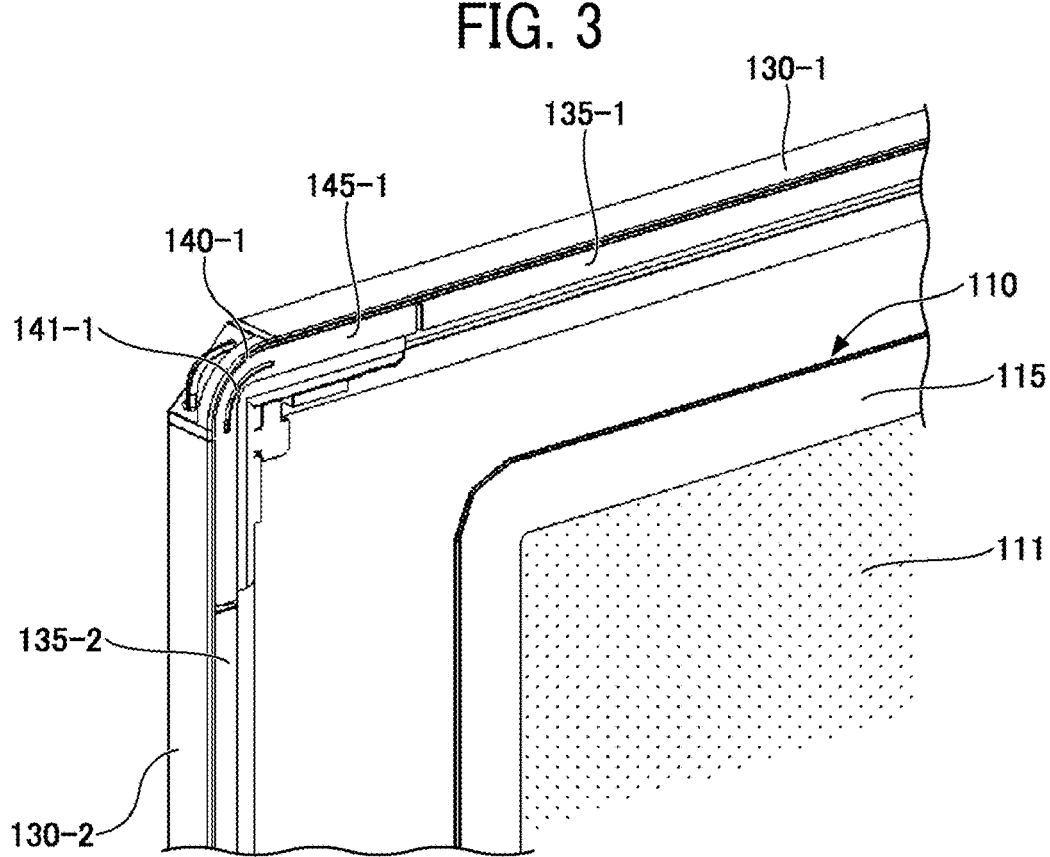
FIG. 3 is a first enlarged view of a portion A of the information display apparatus illustrated in FIG. 2.

A description is given of the adhesive region 200 according to the present embodiment, with reference to FIGS. 3 to 7. FIG. 3 is a first enlarged view of a portion A of the information display apparatus 100 illustrated in FIG. 2.

The portion A is a coupling portion in which the frame 130-1 and the frame 130-2 are coupled by the corner member 140-1. In the present embodiment, for example, the frame 130 is made of metal, and the corner member 140 may be a molded product of resin such as plastic.

In the corner member 140-1 of the present embodiment, as illustrated in FIG. 3, the peripheral portion 145-1 includes a guide groove 141-1. Each of the corner members 140-2, 140-3, and 140-4 includes the guide groove 141-1 similarly.

Figure 4:
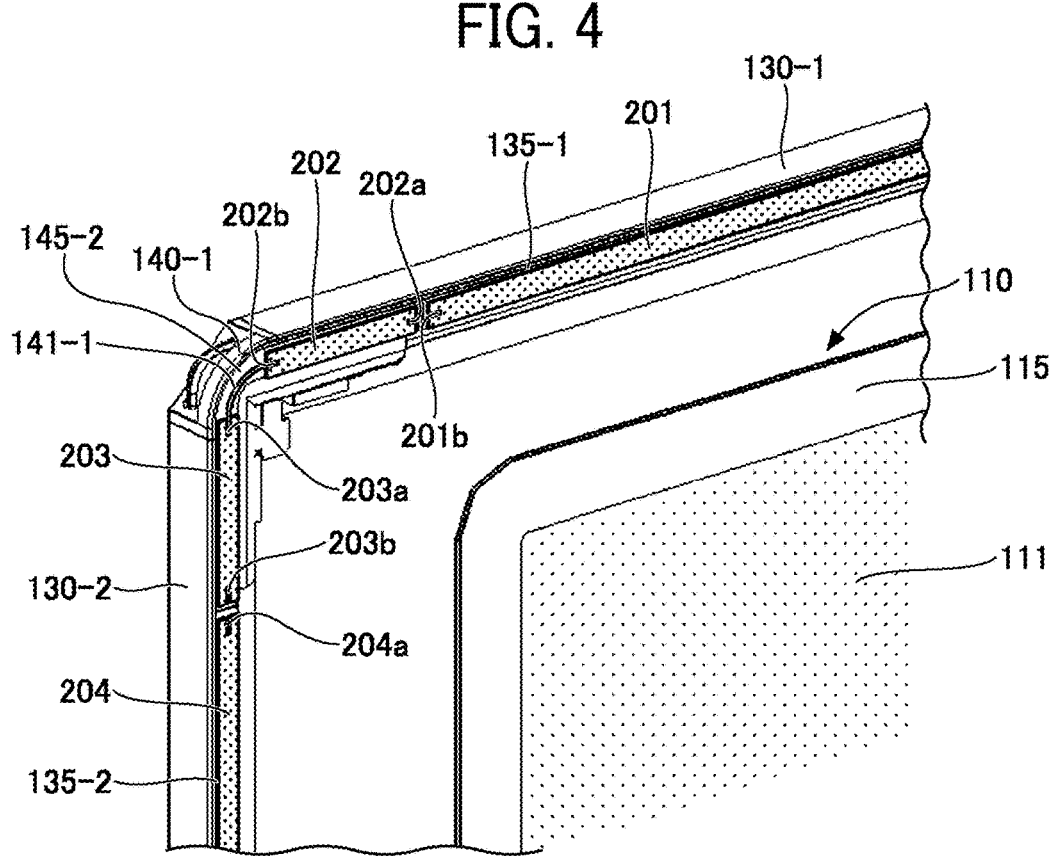
FIG. 4 is a second enlarged view of the portion A of an information display apparatus illustrated in FIG. 2.
Figure 5:
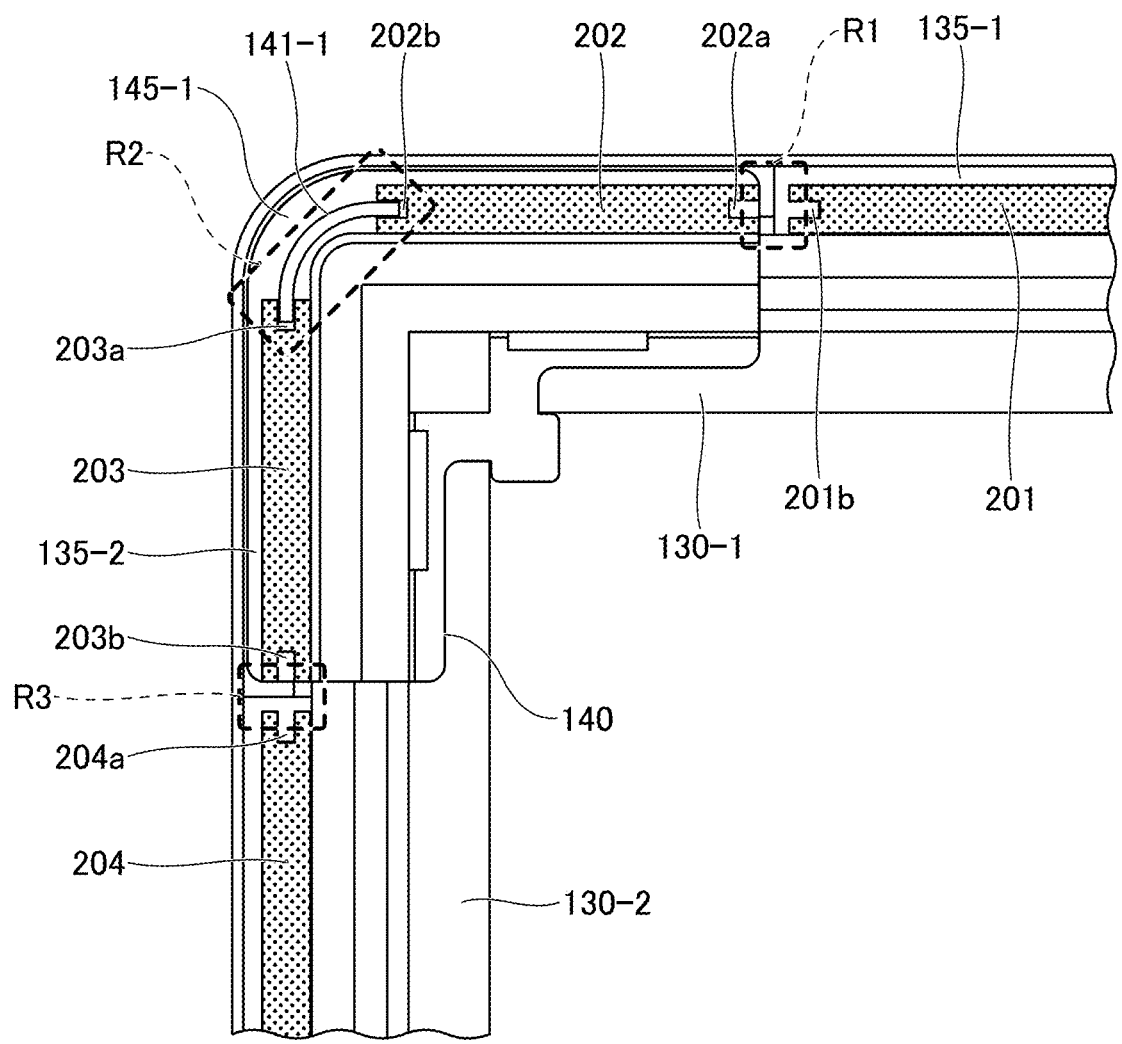
FIG. 5 is a first enlarged plan view of the portion A of the information display apparatus illustrated in FIG. 2.

The adhesive region 200 will be described below with reference to FIGS. 4 to 6. FIG. 4 is a second enlarged view of the portion A of the information display apparatus 100. FIG. 5 is a first enlarged plan view of the portion A of the information display apparatus 100. FIGS. 4 and 5 illustrate the peripheral portion 135 of the frame 130-1 in the state applied with the double-sided adhesive tapes and not applied with the adhesive.

In FIG. 4, to the front side of the peripheral portion 135-1 of the frame 130-1, a rectangular double-sided adhesive tape 201 is attached. To the front side of the peripheral portion 145-1 of the corner member 140-1, double-sided adhesive tapes 203 and 204 are attached with the guide groove 141-1 sandwiched therebetween. To the front side of the peripheral portion 135-2 of the frame 130-2, a double-sided adhesive tape 205 is attached.

In the present embodiment, the double-sided adhesive tapes 201 to 205 may be substantially the same in short-side length. The double-sided adhesive tapes 202 and 203 may be substantially the same in long-side length. The long side of the double-sided adhesive tape 201 is shorter than the side (upper side in the drawings) of the information display 110 facing the frame 130-1. The long side of the double-sided adhesive tape 204 is shorter than the side (left side in the drawings) of the information display 110 facing the frame 130-2.

The double-sided adhesive tapes 201 to 205 are attached to the peripheral portions 135 and 145 such that the long sides of the double-sided adhesive tapes 201 to 205 are substantially parallel to the corresponding sides of the rectangular screen 111 of the information display 110. Further, in the present embodiment, each of the double-sided adhesive tapes in the adhesive region 200 is attached to the peripheral portions 135 or 145 such that the long side thereof is substantially parallel to the corresponding side of the rectangular screen 111 of the information display 110.

In other words, in the adhesive region 200, each of the rectangular double-sided adhesive tapes is disposed with the short side thereof substantially perpendicular to the side of the screen 111 along which the double-sided adhesive tape extends.

In FIG. 4, the double-sided adhesive tape 201 is adjacent to the double-sided adhesive tape 202. One end (the short side) of the double-sided adhesive tape 201 faces one end (the short side) of the double-sided adhesive tape 202. That is, the double-sided adhesive tapes 201 and 202 are disposed with the respective short sides thereof face each other.

Further, one end of the double-sided adhesive tape 201 includes a slit 201b, and one end (facing the double-sided adhesive tape 201) of the double-sided adhesive tape 202 includes a slit 202a. In the present embodiment, the slits 201b and 202a are positioned in areas including the midpoints on the short sides of the double-sided adhesive tapes 201 and 202, respectively. That is, the slits 201b and 202a are respectively in the central portions in the short side direction of the double-sided adhesive tapes 201 and 202 and in the end portions in the longitudinal direction of the double-sided adhesive tapes 201 and 202.

In the present embodiment, since the double-sided adhesive tapes 201 and 202 are substantially the same in short-side length, the slit 201b faces the slit 202a across a gap between the double-sided adhesive tape 201 and the double-sided adhesive tape 202 in a region R1 illustrated in FIG. 5. This gap may be, for example, about 1.0 to 2.0 mm.

The region R1 is a region of the peripheral portion 135 of the frame 130 where the ends of the double-sided adhesive tapes 201 and 202 face each other and a region where the adhesive is applied.

In the present embodiment, the slits 201b and 202a are disposed at the central portions of the end portions of the double-sided adhesive tapes 201 and 202, but the positions thereof are not limited thereto. For example, the slit 201b may be in an upper portion in the end portion of the double-sided adhesive tape 201, and the slit 202a may be in a lower portion of the end portion of the double-sided adhesive tape 202.

The double-sided adhesive tape 202 further includes a slit 202b is at the end opposite to the end where the slit 202a is formed. The slit 202b is formed such that one end of the guide groove 141-1 of the peripheral portion 145-1 is exposed in the slit 202b.

The double-sided adhesive tape 203 includes a slit 203a at one end and a slit 203b at the other end. The slit 203a is formed such that the other end of the guide groove 141-1 is exposed in the slit 203a.

Therefore, in the present embodiment, as illustrated in a region R2 in FIG. 5, the guide groove 141-1 guides a curve extending from the slit 202b of the double-sided adhesive tape 202 to the slit 203a of the double-sided adhesive tape 203. The region R2 is a region where the adhesive is applied to the corner member 140, between the ends of the double-sided adhesive tapes 202 and 203.

The slit 203b of the double-sided adhesive tape 203 faces a slit 204a at one end of the double-sided adhesive tape 204 in a region R3. Similar to the region R1, the region R3 is a region of the peripheral portion 135 of the frame 130 where the ends of the double-sided adhesive tapes 203 and 204 face each other and a region where the adhesive is applied.

Figure 6:
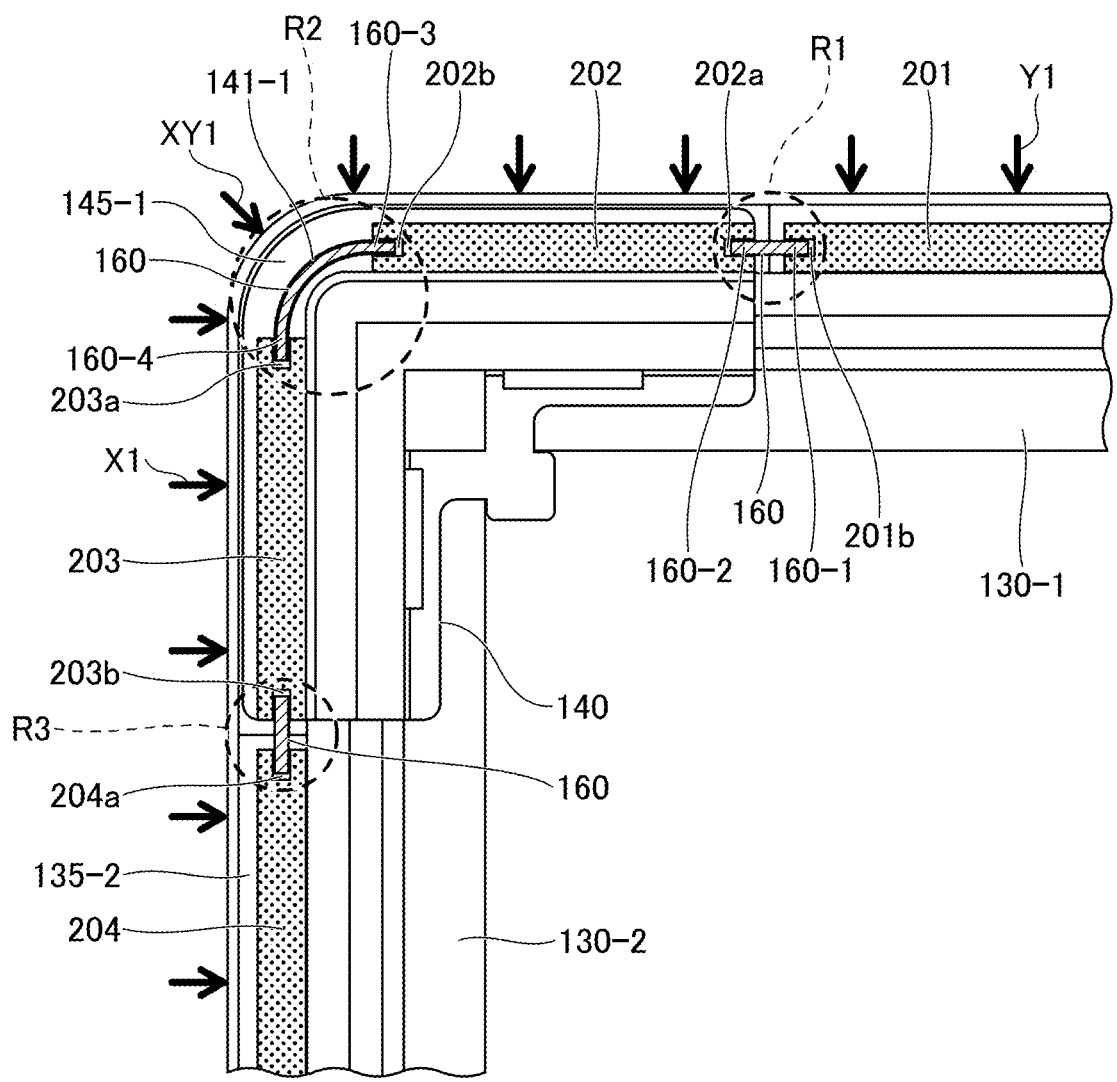
FIG. 6 is a second enlarged plan view of the portion A of the information display apparatus illustrated in FIG. 2.

FIG. 6 is a second enlarged plan view of the portion A of the information display apparatus 100. FIG. 6 illustrates a state in which an adhesive 160 is applied to the regions R1, R2, and R3.

In the example illustrated in FIG. 6, in the region R1, the adhesive 160 is applied so as to couple the slit 201b with the slit 202a. In the region R2, the adhesive 160 is applied so as to couple the slit 202b with the slit 203a along the guide groove 141-1. In the region R3, the adhesive 160 is applied so as to couple the slit 203b with the slit 204a.

In the present embodiment, in this way, the end of the region applied with the adhesive 160 is surrounded in a sideward open U-shape by the double-sided adhesive tape.

For example, in the region R1, an end 160-1 of the region applied with the adhesive 160 is in the slit 201b and surrounded by the double-sided adhesive tape 201. Similarly, an end 160-2 of the region applied with the adhesive 160 is in the slit 202a and surrounded by the double-sided adhesive tape 202.

Further, in the region R2, an end 160-3 of the region applied with the adhesive 160 is in the slit 202b and surrounded by the double-sided adhesive tape 202. Similarly, an end 160-4 of the region applied with the adhesive 160 is in the slit 203a and is surrounded by the double-sided adhesive tape 203.

In the present embodiment, the adhesive 160 is applied so as to couple the slit at the end of one double-sided adhesive tape with the slit at the end of another double-sided adhesive tape in this way. In each of the peripheral portions 135 and 145, the ends of the region applied with the adhesive 160 is surrounded by double-sided adhesive tapes.

In the present embodiment, the short side of the double-sided adhesive tape is substantially vertical to the outer circumference of the region applied with the adhesive 160. In other words, when the shape of the region applied with the adhesive 160 is linear, the linear region is substantially perpendicular to the short side of the double-sided adhesive tape.

Therefore, in the present embodiment, for example, even if water flows from above the frame 130-1 in the direction indicated by arrow Y1 in FIG. 6, the adhesive 160 between the double-sided adhesive tapes 201 and 202 dams the water.

Further, for example, even if water flows from the left of the frame 130-2 in the direction indicated by arrow X1 in FIG. 6, the adhesive 160 between the double-sided adhesive tapes 203 and 204 dams the water. Further, for example, even if water flows toward the corner member 140 in the direction indicated by arrow XY1 in FIG. 6, the adhesive 160 between the double-sided adhesive tapes 202 and 203 dams the water.

Therefore, according to the present embodiment, water is prevented from entering the inside of the housing 120 of the information display apparatus 100.

Further, in the present embodiment, even when the information display apparatus 100 is large, the information display apparatus 100 is made waterproof by the double-sided adhesive tapes cut into rectangular shapes and the adhesive. This feature dispenses with equipment to die-cut the double-sided adhesive tape into a frame shape and equipment to apply the adhesive to the frame-shaped tape. Thus, waterproofness is provided with a simple structure at low cost.

In the present embodiment, the end of the region applied with the adhesive 160 is surrounded by the double-sided adhesive tape. This structure prevents the adhesive 160 from being spread to protrude from the housing 120 in jointing the information display 110 to the peripheral portion 135 of the frame 130. This structure reduces the risk that the appearance of the information display apparatus 100 is degraded.

In the present embodiment, the shape of the slit in the double-sided adhesive tape is rectangular, but the shape is not limited thereto. The slit (the opening) n the double-sided adhesive tape) may have any shape as long as the end of the region applied with the adhesive 160 is surrounded by the double-sided adhesive tape.

Further, according to the present embodiment, the outer periphery of the double-sided adhesive tape is not chipped. Therefore, when the double-sided adhesive tape is attached, the positions of the peripheral portions 135 and 145 and the double-sided adhesive tape can be easily aligned, and the double-sided adhesive tape can be easily attached.

Further, in the present embodiment, the adhesive continuously extends from the slit of one double-sided adhesive tape to the slit of the other double-sided adhesive tape. This facilitates control of the amount of the adhesive applied and reduces the risk of water intrusion into the housing 120.

In the present embodiment, the adhesive 160 is applied to a region having ends surrounded by the double-sided adhesive tape. This feature inhibits the adhesive 160 from being overlaid on the double-sided adhesive tape and accordingly prevents creation of a gap due to a thicker portion in which the adhesive 160 is overlaid on the double-sided adhesive tape. This feature can reduce the risk of water intrusion from the gap is reduced.

Assume that the peripheral portions 135 and 145 do not include the region applied with the adhesive and surrounded by the double-sided adhesive tape. In this case, if the amount of the adhesive 160 is insufficient, in some portion of the peripheral portions 135 and 145, neither the double-sided adhesive tape nor the adhesive 160 is present. Then, water easily enters such a portion. Therefore, in this case, the amount of the adhesive 160 applied is strictly controlled.

By contrast, in the present embodiment, the adhesive 160 is applied to the region having ends surrounded by the double-sided adhesive tapes, and the peripheral portions 135 and 145 do not include the region where neither the double-sided adhesive tape nor the adhesive 160 is present. This feature dispenses with strict control of the amount of the adhesive 160 applied and facilitates application of the adhesive 160.

In the present embodiment, the guide groove 141-1 is formed in the peripheral portion 145 of the corner member 140, but the present disclosure is not limited thereto, and the peripheral portion 145-1 may be without the guide groove 141-1.

In the present embodiment, the double-sided adhesive tapes are attached to the peripheral portions 135 and 145 so as not to overlap each other. The double-sided adhesive tapes may be disposed with a gap interposed therebetween. Alternatively, the double-sided adhesive tapes may be attached to the frame 130 without a gap therebetween. The double-sided adhesive tapes attached to the frame 130 and the corner member 140 have a uniform thickness.

In the present embodiment, the frame 130 is made of metal or the like, and the corner member 140 is made of plastic or the like. That is, the materials of the frame 130 and the corner member 140 are different from each other.

Therefore, preferably, the adhesive 160 of the present embodiment has absorbencies for the coefficients of thermal expansion of, for example, different materials. Specifically, the adhesive 160 may be, for example, a modified silicone adhesive. In the present embodiment, use of such an adhesive 160 prevents cracks in the housing 120 (the frame 130 and the corner member 140) when the adhesive 160 solidifies.

Figure 7:
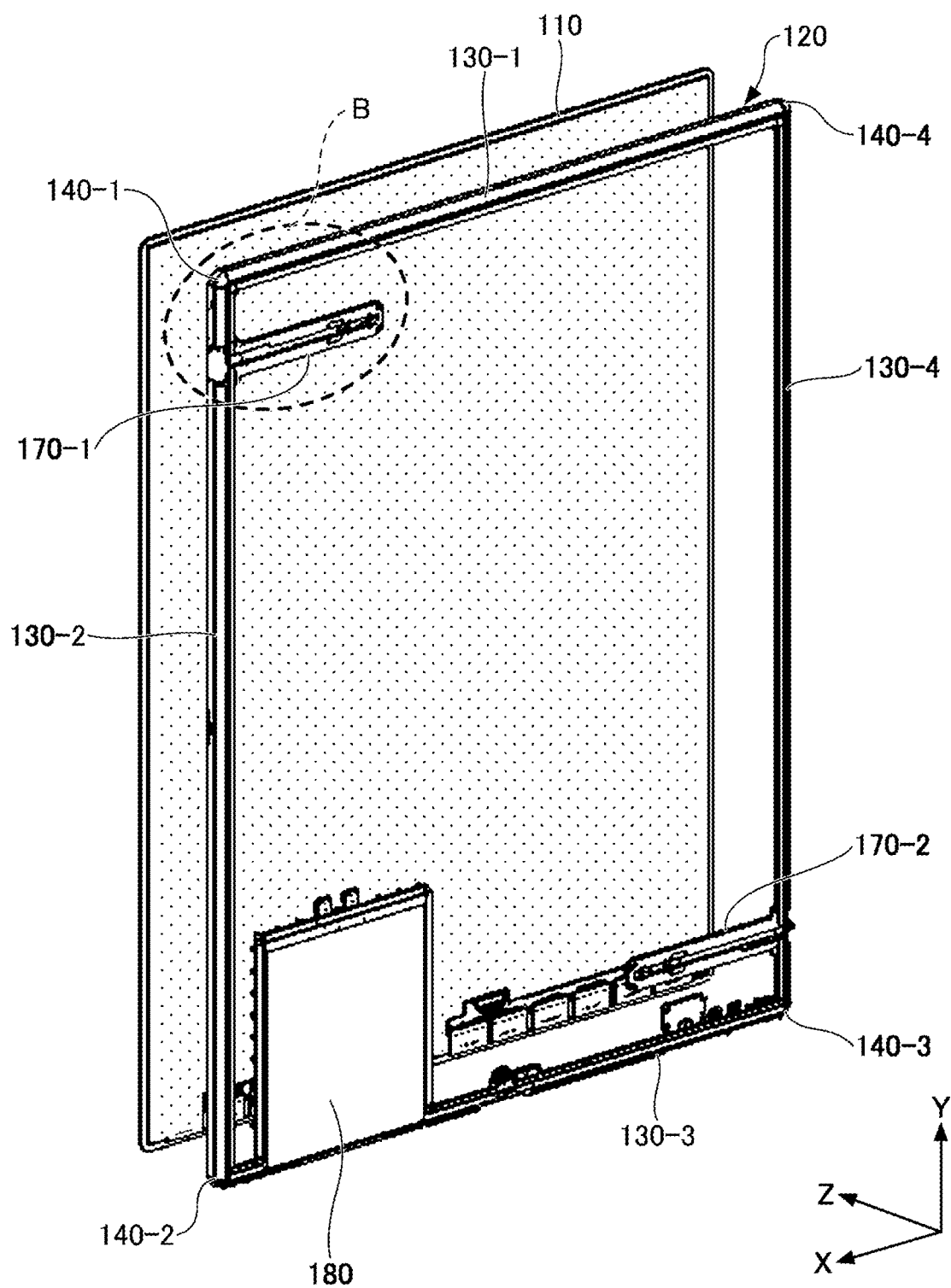
FIG. 7 is a second exploded perspective view of the information display apparatus according to one embodiment.

FIG. 7 is a second exploded perspective view of the information display apparatus 100. FIG. 7 illustrates the information display apparatus 100 to which the back plate 190 (see FIG. 8) is not attached. The housing 120 of the present embodiment includes the pen storages 170-1 and 170-2 to accommodate pen-shaped input devices.

In the present embodiment, the pen storage 170-1 has an insertion port in the frame 130-2 for inserting a pen-shaped input device, and the pen storage 170-2 has an insertion port in the frame 130-4 for inserting a pen-shaped input device. In the following description, the pen storages 170-1 and 170-2 may be collectively referred to as the pen storages 170 when not distinguished from each other.

Since the information display apparatus 100 of the present embodiment includes a plurality of pen storages 170, a plurality of persons can simultaneously perform input to the information display apparatus 100 using the pen-shaped input devices.

Figure 8:
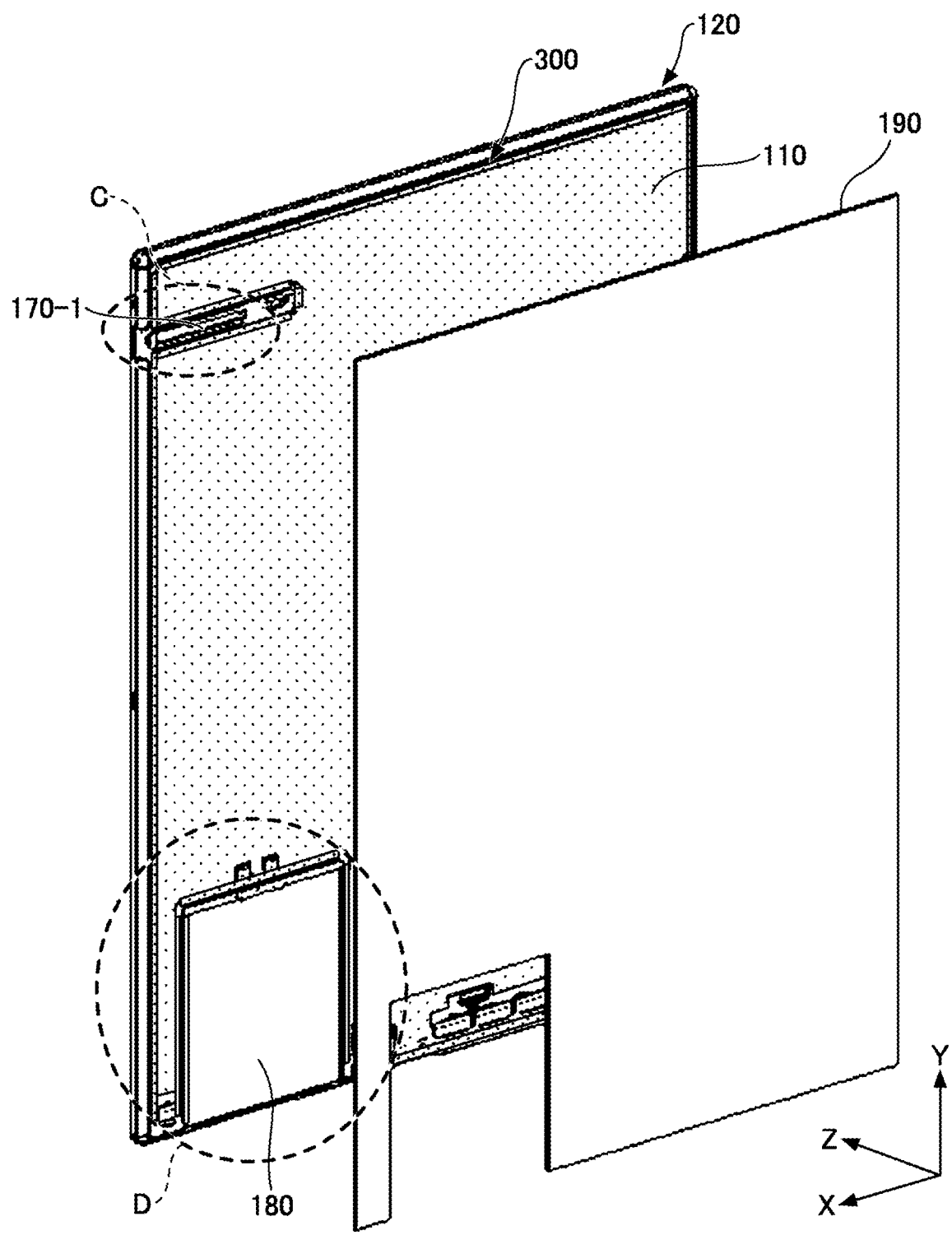
FIG. 8 is a third exploded perspective view of the information display apparatus according to one embodiment.

FIG. 8 is a third exploded perspective view of the information display apparatus 100. FIG. 8 is a view separately illustrating the housing 120 to which the information display 110 is attached and the back plate 190 to be attached to the back side of the information display apparatus 100.

FIG. 8 illustrates a state in which the frame-shaped adhesive region 300 is formed on the back side of the peripheral portion 135 and the back side of the peripheral portion 145 by a plurality of double-sided adhesive tapes divided (cut) into rectangular shapes.

The adhesive region 300 includes a region in the pen storage 170 and a region in the battery storage 180, which are described below.

Figure 9:
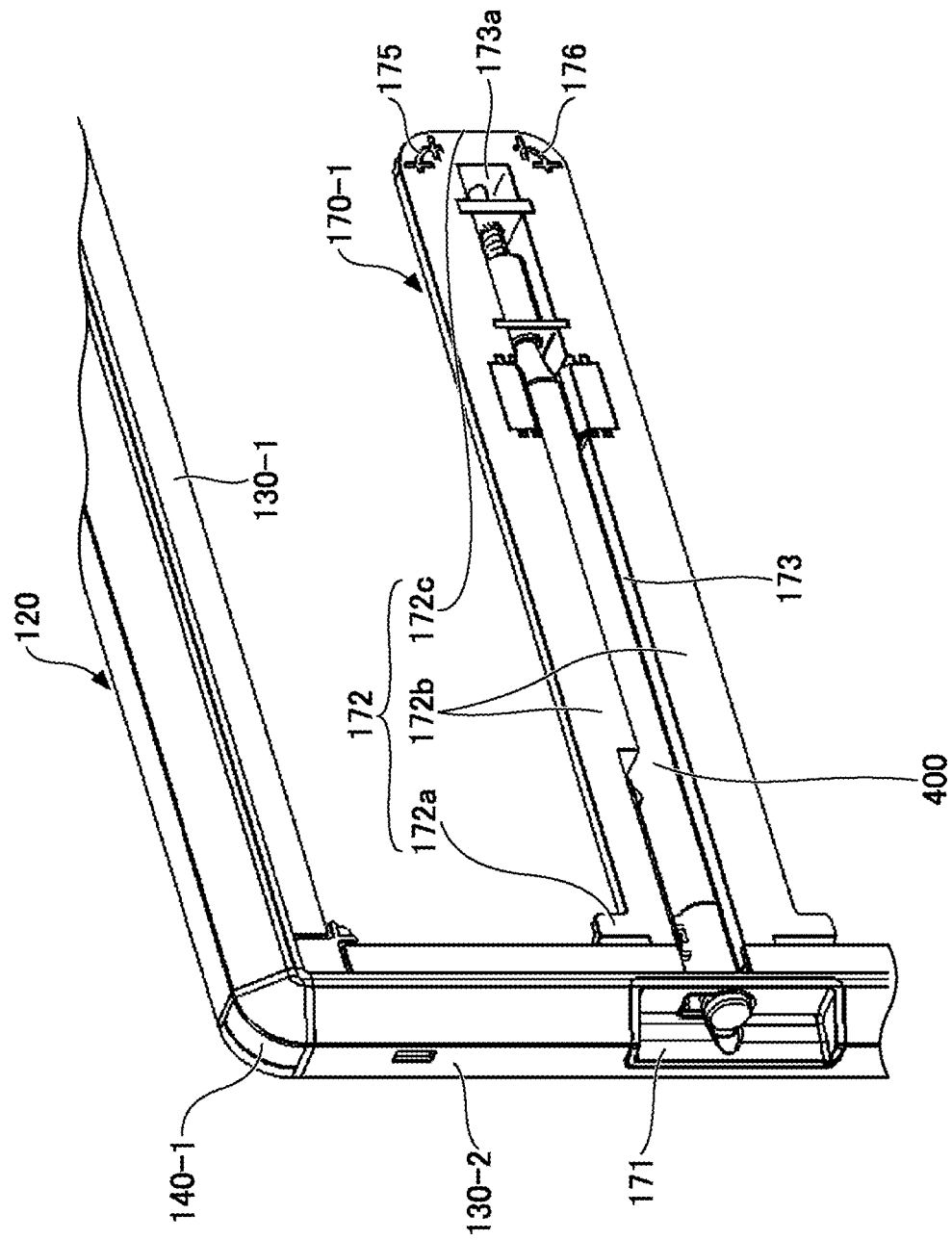
FIG. 9 is a perspective view of a pen storage of the information display apparatus illustrated in FIGS. 7 and 8.

FIG. 9 is a perspective view of the pen storage 170-1. FIG. 9 is an enlarged view of a portion B in FIG. 7. The pen storage 170-1 and the pen storage 170-2 of the present embodiment have the same configuration. Referring to FIG. 9, the pen storage 170-1 is described.

The pen storage 170-1 of the present embodiment includes an insertion port member 171, a holding part 172, and a storage hole 173.

The insertion port member 171 has an insertion port from which a pen-shaped input device 400 (illustrated in FIG. 9) is inserted and stored in the pen storage 170-1. The holding part 172 holds the pen-shaped input device 400 inserted into the pen storage 170-1. The storage hole 173-1 is a hole in the holding part 172. The hole accommodates the pen-shaped input device 400.

The holding part 172 of the present embodiment includes a holding portion 172a, a holding portion 172b, and a holding portion 172c. The holding portion 172a is a portion where the storage hole 173 is formed. The holding portion 172b is a portion that couples the holding portion 172a and the frame 130.

The holding portion 172b extends straight. The holding portion 172c includes a linear portion that provides a wall face 173a and corner portions continuous with the holding portion 172b. The wall face 173a faces the tip of the pen-shaped input device 400 stored in the storage hole 173.

The corner portions of the holding portion 172c include guide grooves 175 and 176, respectively. FIG. 9 illustrates the back side of the pen storage 170, and the guide grooves 175 and 176 are formed also on the front side of the holding portion 172c.

The holding portions 172a, 172b, and 172c may be integral with each other.

In the present embodiment, the double-sided adhesive tapes shaped like strips are attached to the front and back sides of the holding portion 172a, the holding portion 172b, and the holding portion 172c to provide waterproofness of the pen storage 170. A descriptions is given of the double-sided adhesive tapes attached to the holding portions 172a and 172b, with reference to FIGS. 10 and 11.

Figure 10:
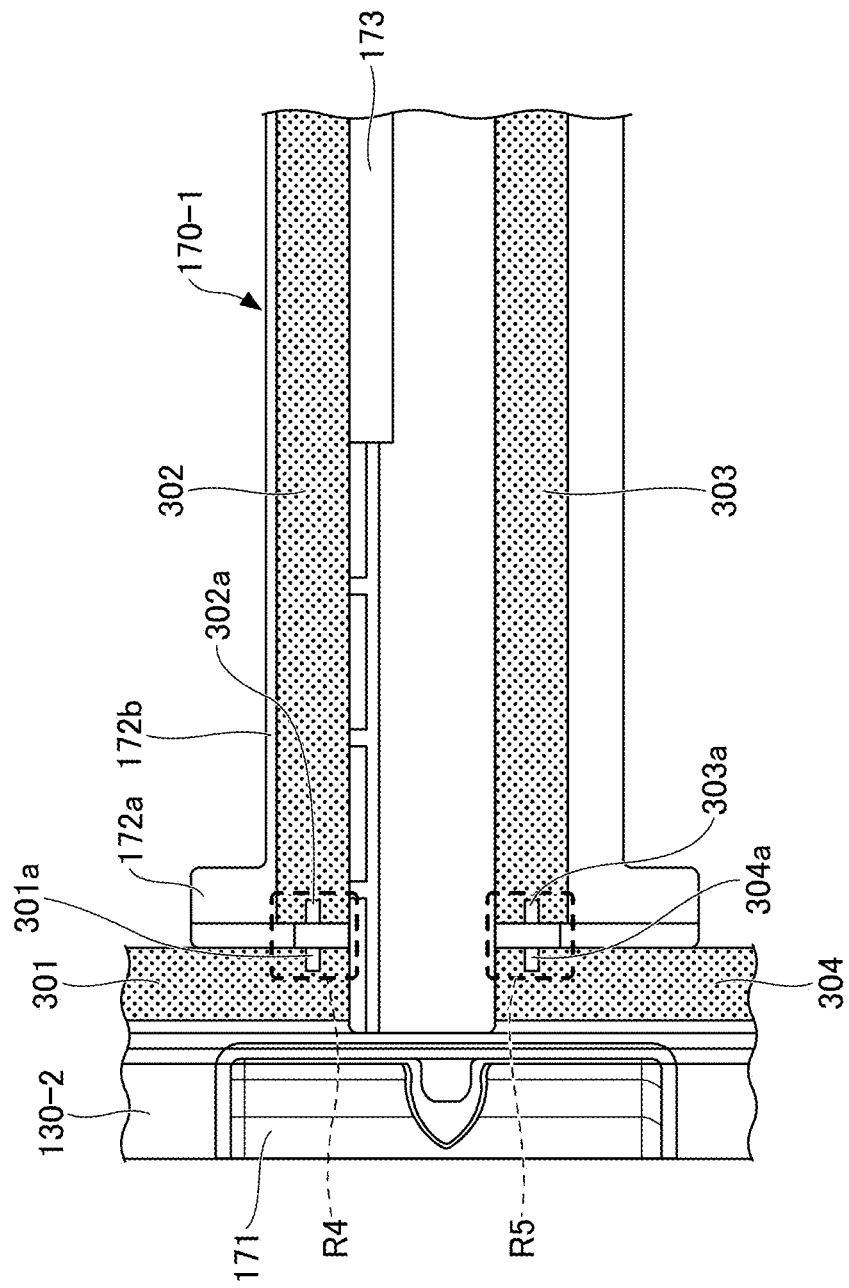
FIG. 10 is a first enlarged plan view of a portion C of the information display apparatus illustrated in FIG. 8.

FIG. 10 is a first partial enlarged plan view of the portion of the information display apparatus 100 including the pen storage 170-1. FIG. 10 is an enlarged view of a portion C illustrated in FIG. 8.

To the back side of the holding portion 172b, double-sided adhesive tapes 301 and 304 are attached. To the back side of the holding portion 172a, double-sided adhesive tapes 302 and 303 are attached.

In FIG. 10, the long side of the double-sided adhesive tape 301 faces the short side of the double-sided adhesive tape 302. The double-sided adhesive tape 301 has a slit 301a in an end portion in the longitudinal direction thereof (vertical direction in the drawings) and at a position facing the short side of the double-sided adhesive tape 302. That is, the slit 301a is open on the long side of the double-sided adhesive tape 301. The double-sided adhesive tape 302 has a slit 302a in an end portion in the longitudinal direction thereof (lateral direction in the drawings) and at a position facing the slit 301a in the double-sided adhesive tape 301. That is the slit 302a is open on the short side of the double-sided adhesive tape 302.

In the present embodiment, in a region R4, the slit 301a faces the slit 302a across a gap between the long side of the double-sided adhesive tape 301 and the short side of the double-sided adhesive tape 302.

Similarly, in FIG. 10, the long side of the double-sided adhesive tape 304 faces the short side of the double-sided adhesive tape 303. The double-sided adhesive tape 304 has a slit 304a in an end portion in the longitudinal direction thereof (vertical direction in the drawings) and at a position facing the short side of the double-sided adhesive tape 303. The slit 304a is open on the long side of the double-sided adhesive tape 304. The double-sided adhesive tape 303 has a slit 303a in an end portion in the longitudinal direction thereof (lateral direction in the drawings) and at a position facing the slit 304a in the double-sided adhesive tape 304. The slit 303a is open on the short side of the double-sided adhesive tape 303. The slits 301a, 302a, 303a, and 304a are examples of openings in the double-sided adhesive tapes.

In the present embodiment, in a region R5, the slit 303a faces the slit 304a across a gap between the short side of the double-sided adhesive tape 303 and the long side of the double-sided adhesive tape 304.

Figure 11:
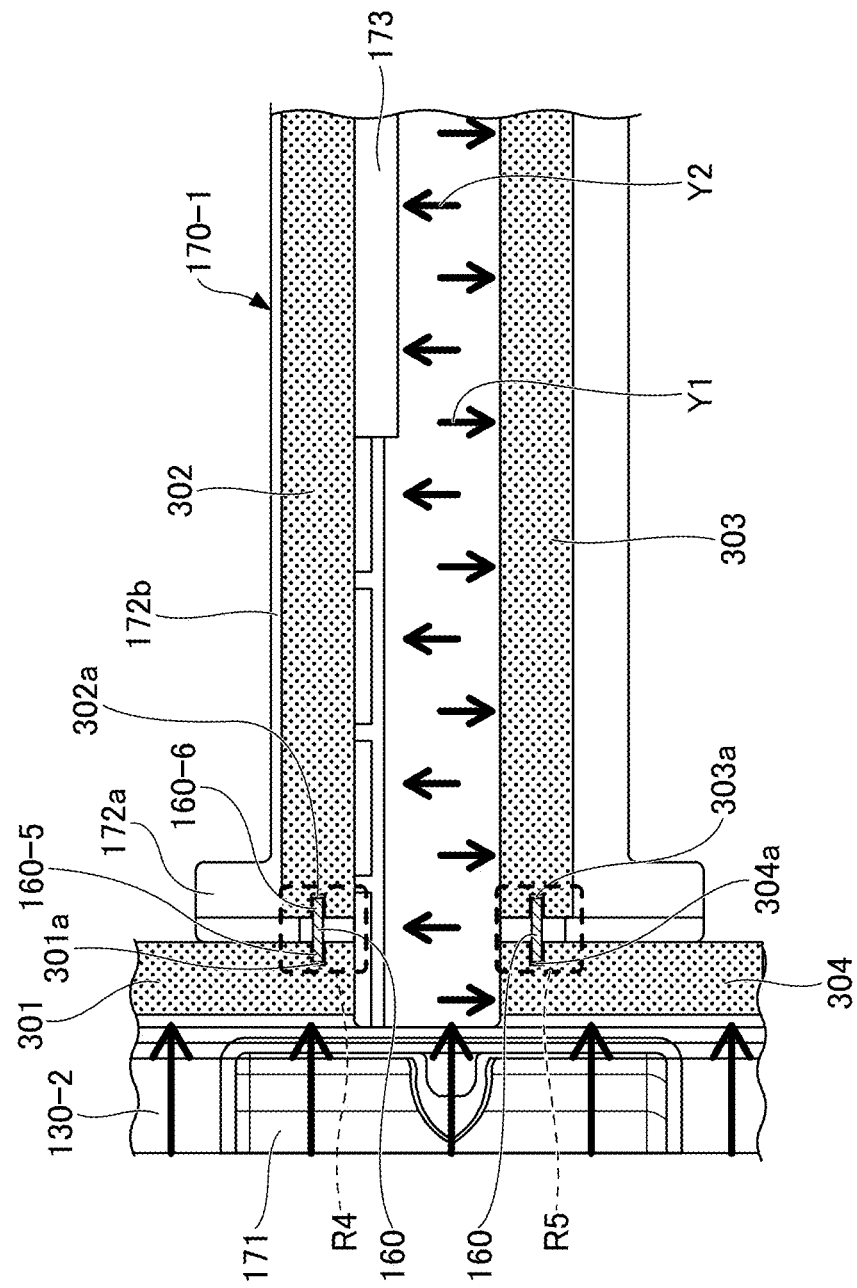
FIG. 11 is a second enlarged plan view of the portion C of the information display apparatus illustrated in FIG. 8.

FIG. 11 is a second enlarged plan view of the portion of the information display apparatus 100 including the pen storage 170-1. FIG. 11 is an enlarged view of the portion C in FIG. 8 and illustrates a state in which the adhesive 160 is applied to the regions R4 and R5.

In the example illustrated in FIG. 11, in the region R4, the adhesive 160 is applied so as to couple the slit 301a and the slit 302a, and in the region R5, the adhesive 160 is applied so as to couple the slit 303a and the slit 304a.

In the regions R4 and R5, ends of the regions applied with the adhesive 160 are surrounded by double-sided adhesive tapes.

Specifically, an end 160-5 of the adhesive 160 applied to the region R4 is in the slit 301a and surrounded by the double-sided adhesive tape 301. Similarly, an end 160-6 of the adhesive 160 applied to the region R4 is in the slit 302a and surrounded by the double-sided adhesive tape 302.

Similar to the region R4, in the region R5, one end of the adhesive 160 is surrounded by the double-sided adhesive tape 303, and the other end of the adhesive 160 is surrounded by the double-sided adhesive tape 304.

In the present embodiment, the adhesive 160 is applied so as to couple the slit at the end of one double-sided adhesive tape with the slit at the end of another double-sided adhesive tape, and ends of the region applied with the adhesive 160 are surrounded by the double-sided adhesive tapes. Further, in the present embodiment, the outer periphery of the region applied with the adhesive 160 in the regions R4 and R5 is parallel to the direction in which the pen-shaped input device 400 is inserted into and removed from the storage hole 173.

In the present embodiment, by attaching the double-sided adhesive tapes to the frame 130 and applying the adhesive thereto in this way, water entering the storage hole 173, if any, is prevented from invading in the directions indicated by arrows Y1 and Y2 in FIG. 11.

In the example illustrated in FIG. 11, the region applied with the adhesive 160 has a rectangular shape that couples the slits, but the shape is not limited thereto.

In the present embodiment, the slit 301a may have any shape as long as the slit 301a is at the position facing the short side of the double-sided adhesive tape 302. The slit 302a may have any shape as long as the slit 302a is at the position facing the long side of the double-sided adhesive tape 301. Therefore, when the adhesive 160 is applied so as to couple the slit 301a and the slit 302a, the shape of the region applied with the adhesive 160 may have a stepped shape (have a difference in height).

Further, although not illustrated in FIG. 11, between one end (the short side) of the double-sided adhesive tape attached to the holding portion 172c (see FIG. 9) and the end of the double-sided adhesive tape 302 opposite to the end including the slit 302a, the adhesive 160 is applied along the guide groove 175 similar to the region R2 illustrated in FIG. 6.

Additionally, between the other end (the short side) of the double-sided adhesive tape attached to the holding portion 172c (see FIG. 9) and the end of the double-sided adhesive tape 303 opposite to the end including the slit 303a, the adhesive 160 is applied along the guide groove 176 similar to the region R2 illustrated in FIG. 6.

Figure 12:
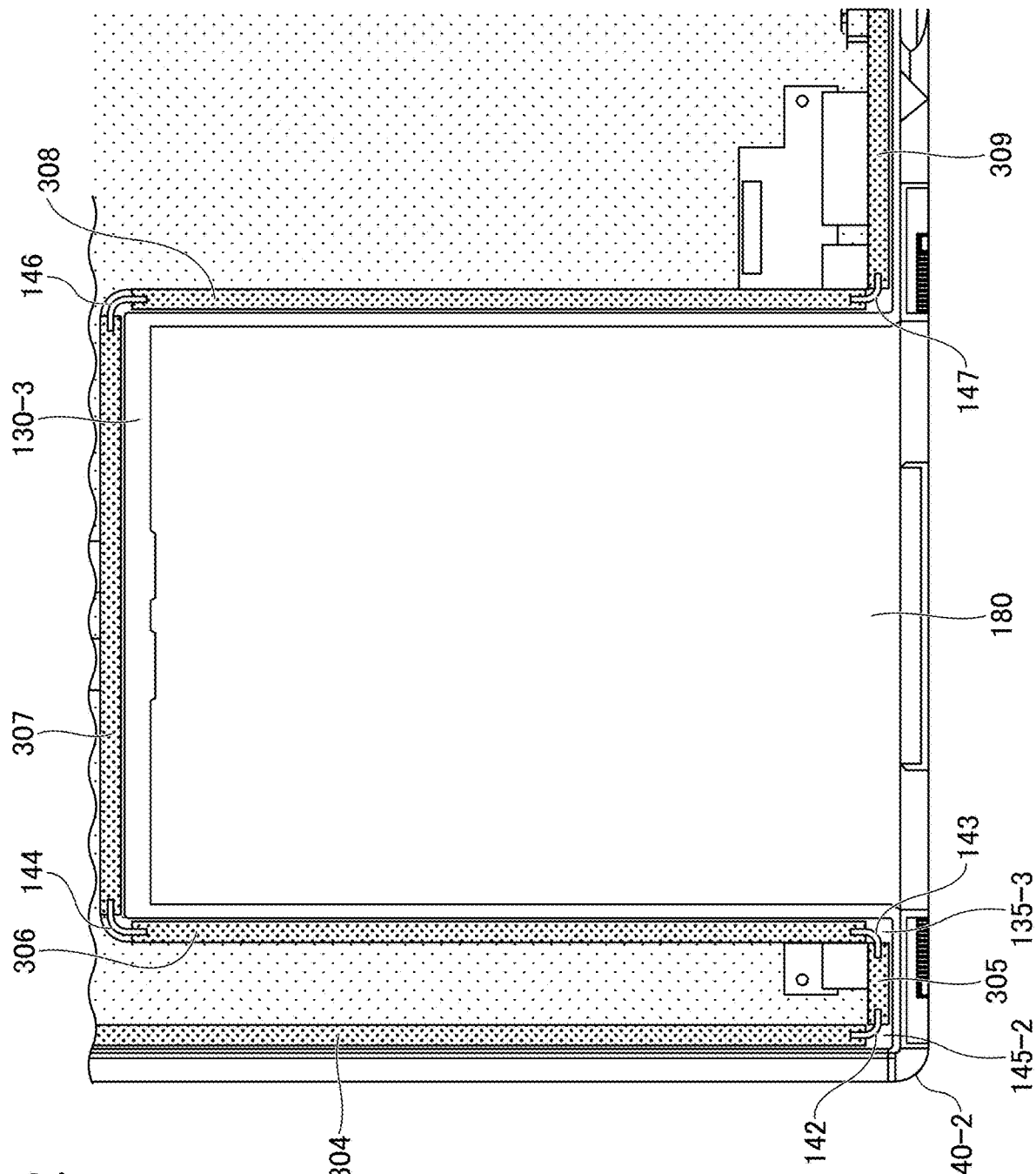
FIG. 12 is an enlarged view of a portion D of the information display apparatus illustrated in FIG. 8.

FIG. 12 is an enlarged view of a portion including the battery storage 180 of the information display apparatus 100. FIG. 12 is an enlarged plan view of a portion D illustrated in FIG. 8.

In the present embodiment, the frame 130-3 also serves as an outer frame of the battery storage 180. In other words, the outer frame of the battery storage 180 is integral with the frame 130-3.

In FIG. 12, to the frame 130-3, double-sided adhesive tapes 305, 306, 307, 308, and 309 are attached.

In FIG. 12, the double-sided adhesive tapes 304 and 305 are coupled by the adhesive 160 guided by a guide groove 142 in the peripheral portion 145-2 of the corner member 140-2.

The frame 130 includes a guide groove 143 between the double-sided adhesive tapes 305 and 306 and a guide groove 144 between the double-sided adhesive tapes 306 and 307. The frame 130-3 includes a guide groove 146 between the double-sided adhesive tapes 307 and 308 and a guide groove 146 between the double-sided adhesive tapes 308 and 309. Similar to the region R2 illustrated in FIG. 6, the adhesive 160 is applied to the guide grooves 142, 143, 144, 146, and 147.

Therefore, in the present embodiment, water is prevented from entering the inside of the housing 120 from the battery storage 180.

In the present embodiment, to the frame 130, a single rectangular double-sided adhesive tape may be attached, or a plurality of rectangular double-sided adhesive tapes may be attached. The plurality of double-sided adhesive tapes attached to the frame 130 is joined with the adhesive 160 in a method similar to the method for the area R1 illustrated in FIG. 6.

As described above, according to the present embodiment, waterproofness is provided at low cost.

Figure 13:
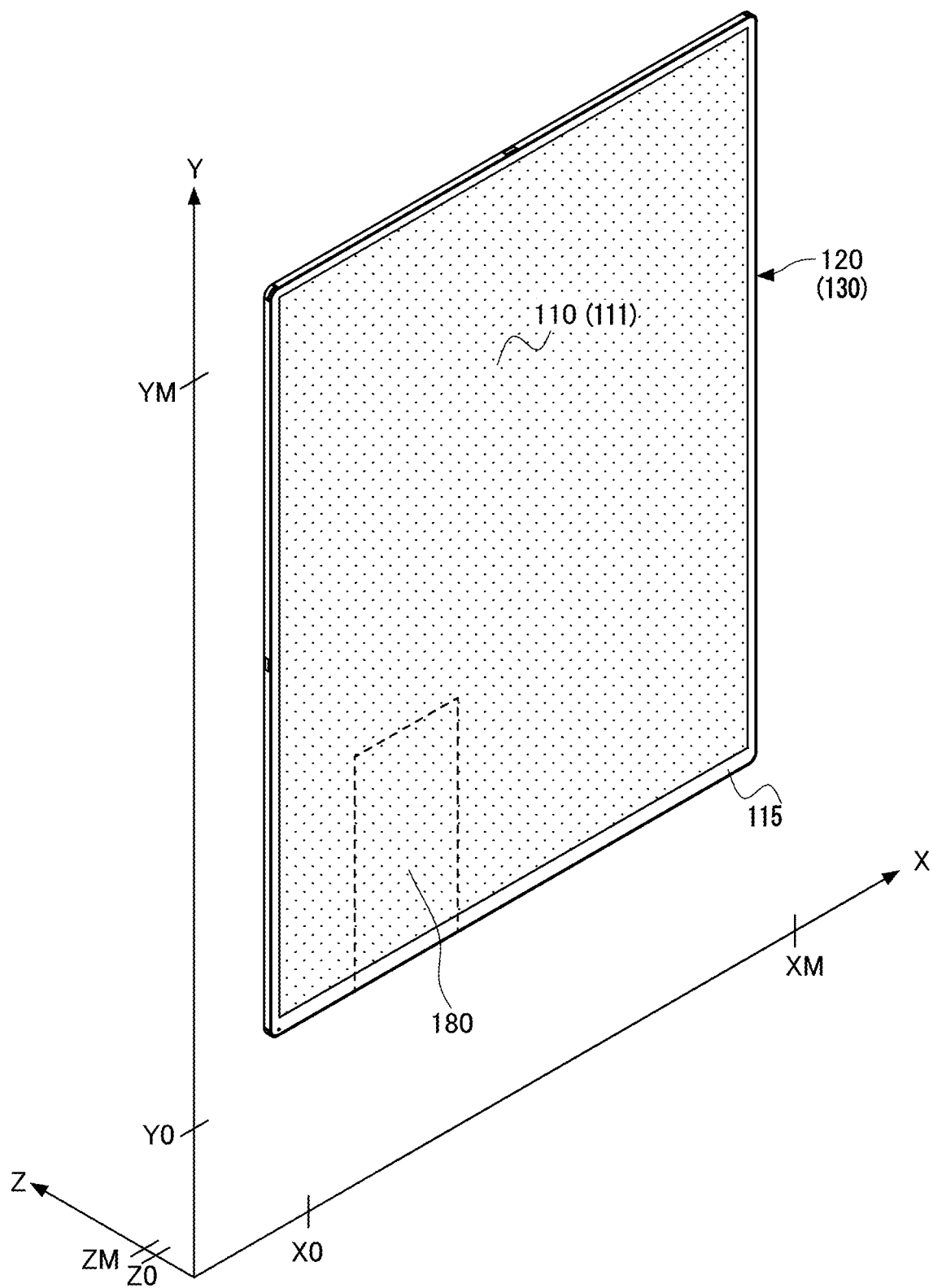
FIG. 13 is a view illustrating the relationship between the information display apparatus illustrated in FIG. 1 and three-dimensional coordinate axes.

FIG. 13 is a view illustrating the relationship between the information display apparatus 100 and the three-dimensional coordinate axes. FIG. 13 illustrates the information display apparatus 100 placed in a virtual three-dimensional coordinate system (XYZ Cartesian coordinate system).

A description is given below of relative positions of the parts of the information display apparatus 100 according to the present embodiment in a virtual three-dimensional coordinate space. Assume that, in the virtual three-dimensional coordinates, the information display apparatus 100 according to the present embodiment extends in the range from coordinates (X0,Y0,Z0) to an X coordinate XM, to a Y coordinate YM, and a Z coordinate ZM. The peripheral portion 135 (e.g., the peripheral portions 135-1 illustrated in FIG. 2) of the frame 130 of the housing 120 and the peripheral portion 145 (e.g., the peripheral portion 145-1 illustrated in FIG. 2) of the corner member 140 of the housing 120 are planes parallel to the XY plane. The screen 111 and the bezel 115 of the information display 110 are planes parallel to the XY plane on the Z coordinate (Z0).

The present disclosure is not limited to the configurations of the above-described embodiment, and another element may be combined with the configuration described above. The configuration and combination of elements can be modified without departing from the spirit of the present disclosure, and can be appropriately determined according to the form of application.

The invention claimed is:

1. A display apparatus comprising:
a display;
a housing including a peripheral portion having a first side to which the display is attached, and a second side opposite the first side;
a back plate attached to the second side of the peripheral portion of the housing; and
a plurality of double-sided adhesive tapes attached to the peripheral portion, each of the plurality of double-sided adhesive tapes including an end portion having an opening,
the peripheral portion including an adhesive-applied region applied with adhesive and a region not applied with adhesive, the adhesive-applied region extending from the opening in one of the plurality of double-sided adhesive tapes to the opening in an adjacent one of the plurality of double-sided adhesive tapes.

2. The display apparatus according to claim 1,
wherein each of the plurality of double-sided adhesive tapes has a rectangular shape.

3. The display apparatus according to claim 2,
wherein the opening in the one of the plurality of double-sided adhesive tapes is open on a long side of the rectangular shape, and
wherein the opening in the adjacent one of the plurality of double-sided adhesive tapes is open on a short side of the rectangular shape facing the long side of the one of the plurality of double-sided adhesive tapes.

4. The display apparatus according to claim 2,
wherein the opening in the one of the plurality of double-sided adhesive tapes is open on a short side of the rectangular shape, and
wherein the opening in the adjacent one of the plurality of double-sided adhesive tapes is open on a short side of the rectangular shape.

5. The display apparatus according to claim 1,
wherein adjacent two of the plurality of double-sided adhesive tapes are disposed across a gap.

6. The display apparatus according to claim 1,
wherein the housing includes:
a plurality of frames each including the peripheral portion; and
a plurality of corner members each including the peripheral portion and coupling two of the plurality of frames, and
wherein the adhesive-applied region extends from one of the plurality of frames to adjacent one of the plurality of corner members.

7. The display apparatus according to claim 6,
wherein the peripheral portion of each of the plurality of corner members includes a curved guide groove extending from the opening in the one of the plurality of double-sided adhesive tapes to the opening in the adjacent one of the plurality of double-sided adhesive tapes.

8. The display apparatus according to claim 6,
wherein the display has a rectangular shape, and each of the plurality of double-sided adhesive tapes has a rectangular shape, and
wherein one or more of the plurality of double-sided adhesive tapes attached to the plurality of frames has a long side shorter than a side of the display to which the double-sided adhesive tape adheres.

9. The display apparatus according to claim 1,
wherein the opening in each of the plurality of double-sided adhesive tapes is shaped such that an end portion of the adhesive-applied region is surrounded by the double-sided adhesive tape.

10. The display apparatus according to claim 1,
wherein the adhesive has absorbencies for coefficients of thermal expansion of different materials.

11. The display apparatus according to claim 1,
wherein the adhesive includes a modified silicone adhesive.

12. The display apparatus according to claim 1,
wherein the peripheral portion includes a guide groove extending from the opening in the one of the plurality of double-sided adhesive tapes to the opening in the adjacent one of the plurality of double-sided adhesive tapes.

13. The display apparatus according to claim 12,
wherein a first end of the guide groove is exposed in the opening in the one of the plurality of double-sided adhesive tapes, and a second end of the guide groove is exposed in the opening in the adjacent one of the plurality of double-sided adhesive tapes.

14. The display apparatus according to claim 13,
wherein the opening is a slit disposed in a central portion of each of the plurality of double-sided adhesive tapes.

15. The display apparatus according to claim 14,
wherein adhesive is applied in the adhesive-applied region along the guide groove.

16. The display apparatus according to claim 1,
wherein the opening is a slit disposed in a central portion of each of the plurality of double-sided adhesive tapes.

* * * * *